(12) United States Patent
Hirotani

(10) Patent No.: US 9,582,903 B2
(45) Date of Patent: Feb. 28, 2017

(54) DISPLAY TERMINAL DEVICE CONNECTABLE TO EXTERNAL DISPLAY DEVICE AND METHOD THEREFOR

(71) Applicant: CASIO COMPUTER CO., LTD., Tokyo (JP)

(72) Inventor: Takayuki Hirotani, Akiruno (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 207 days.

(21) Appl. No.: 13/937,579

(22) Filed: Jul. 9, 2013

(65) Prior Publication Data

US 2014/0028719 A1    Jan. 30, 2014

(30) Foreign Application Priority Data

Jul. 30, 2012  (JP) ................................. 2012-168700

(51) Int. Cl.
  *G06T 11/00*    (2006.01)
  *G06F 3/0488*   (2013.01)
  *G06F 3/14*     (2006.01)

(52) U.S. Cl.
  CPC .......... *G06T 11/00* (2013.01); *G06F 3/04883* (2013.01); *G06F 3/1454* (2013.01);
  (Continued)

(58) Field of Classification Search
  CPC ......... G06F 3/0488; G06F 2203/04808; G06F 3/0416; G06F 3/017; G06F 3/0486; G06F 3/0485; G06F 3/03547; G09G 2354/00
  See application file for complete search history.

(56) References Cited

U.S. PATENT DOCUMENTS 7,239,305 B1   7/2007 Nakano et al.
8,274,476 B2 * 9/2012 Wei ............................... 345/157
(Continued)

FOREIGN PATENT DOCUMENTS

CN   101211240 A    7/2008
JP   2001117697 A   4/2001
(Continued)

OTHER PUBLICATIONS

Korean Office Action dated May 23, 2014 issued in counterpart Korean Application No. 10-2013-0089788.
(Continued)

*Primary Examiner* — Jeffrey Chow
(74) *Attorney, Agent, or Firm* — Holtz, Holtz & Volek PC

(57) ABSTRACT

The present invention is to maintain the viewability of display without impairing operability on a terminal side, even when the details of a touch operation performed on a display terminal device are transmitted to an external display device for display. In the present invention, when a touch operation is detected in an external transmission mode, the display terminal device generates details of a composite screen obtained by superimposing operation information (operation icon or animation image) indicating details of the touch operation on contents being displayed on the display screen (terminal screen), and transmits the contents of the composite screen to the external display device so as to change display contents on the external display device (display contents on its screen).

7 Claims, 7 Drawing Sheets

(52) U.S. Cl.
CPC ............... *G06F 2203/0383* (2013.01); *G06F 2203/04801* (2013.01)

(56) References Cited

U.S. PATENT DOCUMENTS

| | | |
|---|---|---|
| 8,913,009 B2* | 12/2014 | Takeda et al. ................ 345/158 |
| 8,952,956 B2* | 2/2015 | Sato et al. .................... 345/419 |
| 2001/0011992 A1* | 8/2001 | Juen ........................ G06F 3/033 345/156 |
| 2010/0171712 A1* | 7/2010 | Cieplinski ........... G06F 3/04883 345/173 |
| 2012/0098754 A1 | 4/2012 | Kim |
| 2012/0249466 A1* | 10/2012 | Ito .......................... G08C 17/02 345/173 |
| 2012/0327126 A1* | 12/2012 | Solismaa ............ G06F 3/04883 345/661 |
| 2013/0038555 A1* | 2/2013 | Maeda et al. ................. 345/173 |
| 2013/0113993 A1* | 5/2013 | Dagit, III ................ G06F 3/017 348/552 |
| 2013/0222229 A1* | 8/2013 | Kanda ........................... 345/156 |
| 2013/0235035 A1* | 9/2013 | Nara et al. .................... 345/419 |

FOREIGN PATENT DOCUMENTS

| | | |
|---|---|---|
| JP | 2007-310903 A | 11/2007 |
| JP | 2011039216 A | 2/2011 |
| JP | 2011253249 A | 12/2011 |
| JP | 5226142 B1 | 7/2013 |
| KR | 1020110044424 A | 4/2011 |
| WO | 2012081299 A1 | 6/2012 |

OTHER PUBLICATIONS

Japanese Office Action (and English translation thereof) dated Nov. 5, 2015, issued in counterpart Japanese Application No. 2012-168700.

Japanese Office Action dated May 20, 2015 issued in counterpart Japanese Application No. 2012-168700.

Chinese Office Action (and English translation thereof) dated Nov. 3, 2015, issued in counterpart Chinese Application No. 201310367280.5.

* cited by examiner

FIG. 3
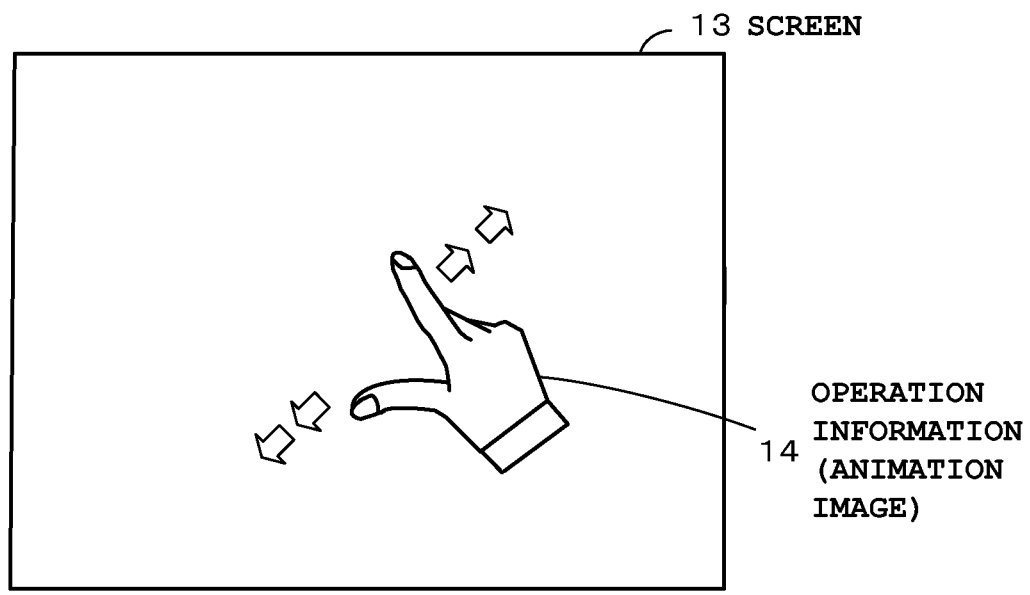
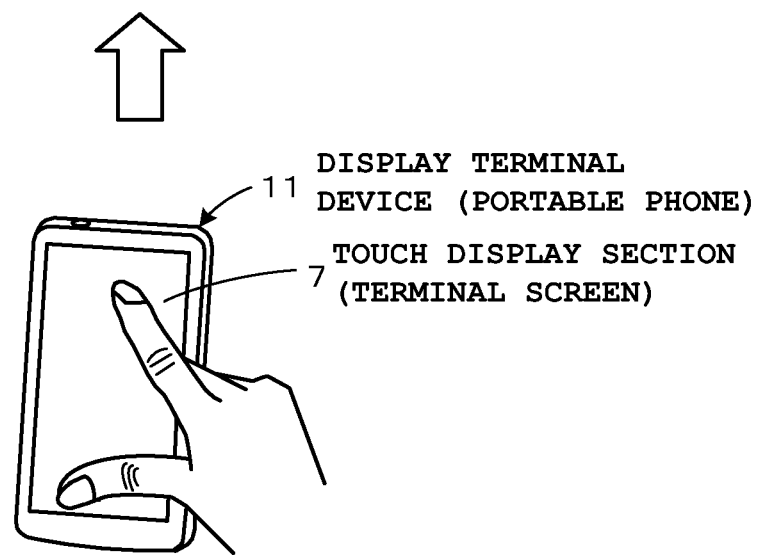

FIG. 4

T1 TOUCH OPERATION TABLE

| TOUCH OPERATION DETAILS | | OPERATION INFORMATION |
|---|---|---|
| TOUCH OPERATION INDICATING POINT ON SCREEN (POINT INDICATING OPERATION) | KEY TOUCH OPERATION | A ICON |
| | CURSOR MOVING OPERATION | B ICON |
| | MULTI-TOUCH OPERATION | C ICON |
| | ⋮ | ⋮ |
| TOUCH OPERATION FOR INSTRUCTING CHANGE OF CONTENTS BEING DISPLAYED ON SCREEN (GESTURE DISPLAY OPERATION) | FLICK OPERATION | A ANIMATION IMAGE |
| | PINCH-IN OPERATION | B ANIMATION IMAGE |
| | PINCH-OUT OPERATION | C ANIMATION IMAGE |
| | ⋮ | ⋮ |
| TOUCH OPERATION FOR INSTRUCTING INPUT OF COMMAND OR DATA (GESTURE INPUT OPERATION) | COMMAND W INPUT OPERATION | X ANIMATION IMAGE |
| | COMMAND E INPUT OPERATION | Y ANIMATION IMAGE |
| | NUMERICAL VALUE 1 INPUT OPERATION | Z ANIMATION IMAGE |
| | ⋮ | ⋮ |

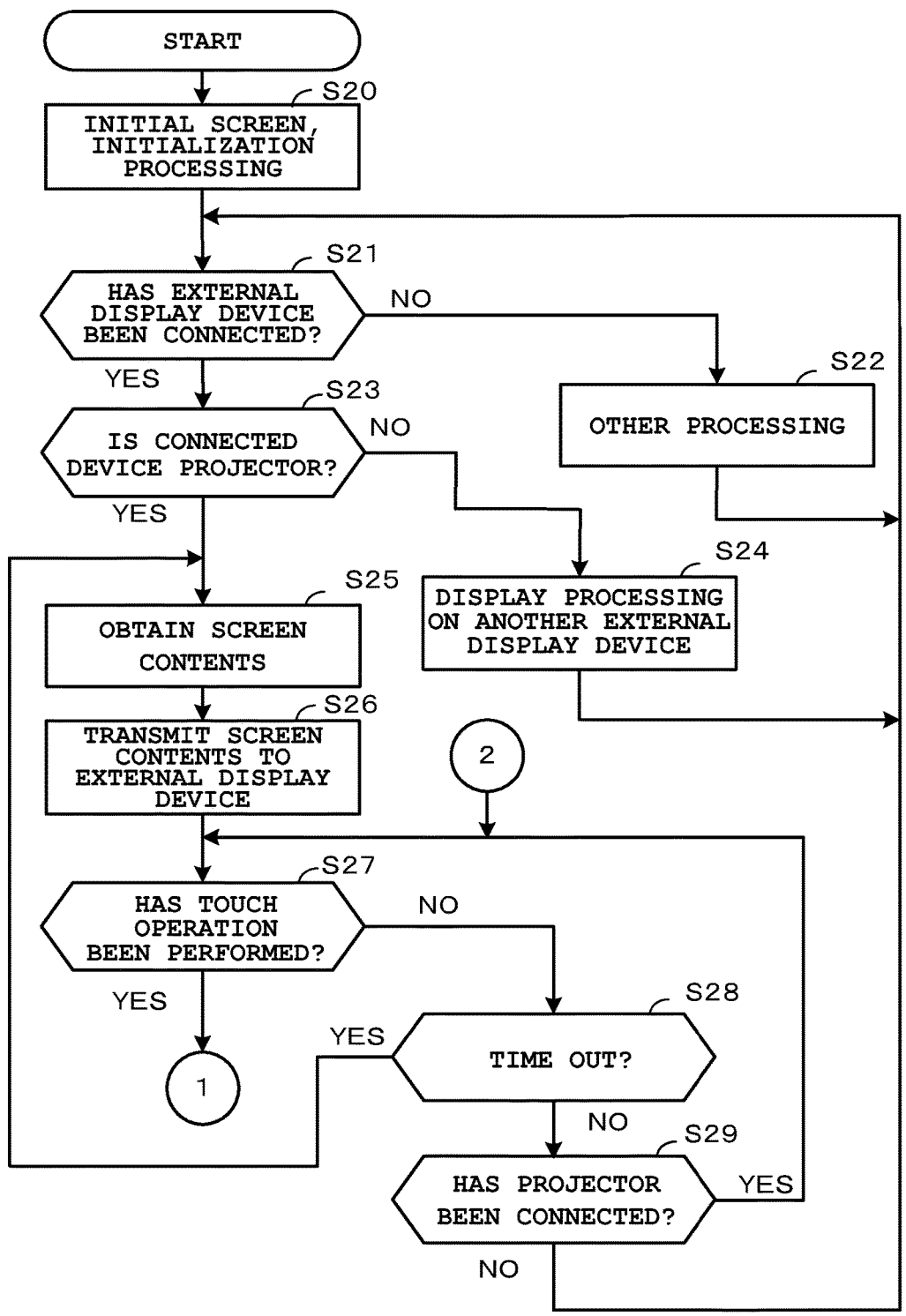

DISPLAY TERMINAL DEVICE CONNECTABLE TO EXTERNAL DISPLAY DEVICE AND METHOD THEREFOR

CROSS-REFERENCE TO RELATED APPLICATION

This application is based upon and claims the benefit of priority from the prior Japanese Patent Application No. 2012-168700, filed Jul. 30, 2012, the entire contents of which are incorporated herein by reference.

BACKGROUND OF THE INVENTION

1. Field of the Invention

The present invention relates to a display terminal device connectable to an external display device, and a method for the display terminal device.

2. Description of the Related Art

In general, when a projector (external display device) is connected to a display terminal device such as a portable terminal device including a touch panel on a display screen at the time of presentation in a meeting or the like, and contents displayed on the terminal screen are projected onto a screen, all that is projected are the contents displayed on the terminal screen. Therefore, it is difficult to let participants viewing the screen in the presentation know a relation between a touch operation and the displayed contents, or in other words, a relation between the type of a touch operation performed on the terminal screen and how the displayed contents are changed thereby.

To address this problem, a method may be applied in which the status of a touch operation on a terminal screen is captured by a camera and the captured image is projected onto a screen for demonstration of the touch operation. However, in this method, part of the display screen is often hidden under a finger or palm at the time of a touch operation, which makes projected contents extremely difficult to view.

Conventionally, a technology has been proposed which supports demonstration of a touch operation. In this technology, when a touch operation is performed on a display terminal side with a external display device being connected to the display terminal device, a mark indicating the touched point is displayed on the terminal screen and a corresponding point on the external display device (Japanese Patent Application Laid-Open (Kokai) Publication No. 2007-310903)

SUMMARY OF THE INVENTION

In the above-described technology, since the mark indicating a touched point is displayed on an external display device, the viewers can know the state of the touch operation. However, because the displayed contents are different from usual display, it is difficult for the operator on the terminal side to perform operation. In addition, displayed contents near the touched point are possibly difficult to view.

The present invention is to maintain the viewability of display without impairing operability on a terminal side, even when details of a touch operation performed on the display terminal device are transmitted to an external display device for display.

In order to solve the above-described problems accordance with one aspect of the present invention, there is provided a display terminal device to which an external display device is connectable, comprising: a detecting section which detects a touch operation on a display screen; a judging section which judges whether an external transmission mode for transmitting contents being displayed on the display screen to the external display device has been set; a superimposing section which, when the judging section judges that the external transmission mode has been set and the detecting section detects a touch operation, generates contents of a composite screen obtained by superimposing operation information indicating details of the touch operation on the contents being displayed on the display screen; and a display control section which changes display contents on the external display device by transmitting the contents of the composite screen generated by the superimposing section to the external display device.

In accordance with another aspect of the present invention, there is provided a display terminal device to which an external display device is connectable, comprising: a detecting section which detects a touch operation on a display screen; a judging section which judges whether the external display device has been connected; a superimposing section which, when the judging section judges that the external display device has been connected and the detecting section detects a touch operation, generates contents of a composite screen obtained by superimposing details of the touch operation on contents being displayed on the display screen; and a display control section which changes display contents on the external display device by transmitting the contents of the composite screen generated by the superimposing section to the external display device.

According to the present invention the viewability of display can be maintained without impairing operability on a terminal side, even when details of a touch operation performed on the display terminal device are transmitted to an external display device for display. Thus, the present invention is practically useful in that operability and viewability can both be satisfied.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a diagram depicting an example in which a touch operation (gesture operation) has been performed for instructing change of contents displayed on the portable terminal device 11;

FIG. 4 is a diagram for describing a touch operation table T1;

FIG. 7 is a flowchart of an operation that is performed in a second embodiment in place of the operation of FIG. 5.

DETAILED DESCRIPTION OF THE PREFERRED EMBODIMENTS

Embodiments of the present invention will hereinafter be described in detail with reference to the drawings.

<First Embodiment>

First, a first embodiment of the present invention is described with reference to FIG. 1 to FIG. 6.

Figure 1:
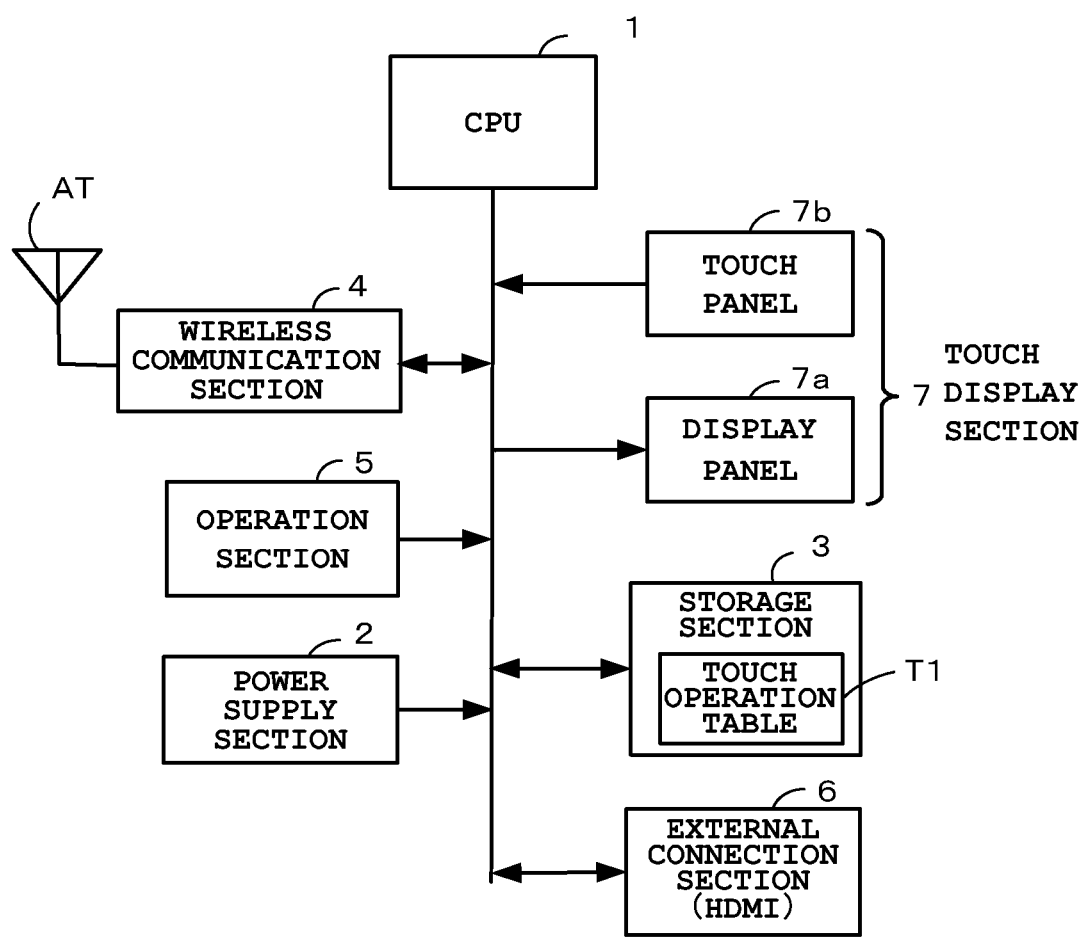
FIG. 1 is a block diagram of basic components of a portable terminal device (smartphone)

In the present embodiment, the present invention has been applied to a portable terminal device (for example, a multifunctional portable phone, that is, a smartphone) as a display terminal device. FIG. 1 is a block diagram of basic components of the portable terminal device.

The portable terminal device (display terminal device) includes, as basic functions, a calling function, a touch input function, an electronic mail function, an Internet connection function (Web access function), and the like. A CPU (Central Processing Unit) 1 operates by receiving power from a power supply section 2 equipped with a secondary battery, and controls the entire operation of the portable terminal device according to various programs in a storage section 3.

The storage section 3 is structured to include a program area for storing various programs such as a program depicted in FIG. 5 and FIG. 6 which will be described further below, a data area for storing various data required for the portable terminal device, and a work area for temporary storage. In this data area, a touch operation table T1 is stored, which will he described further below. Note that the storage section 3 may be configured to include a recording medium such as an SD card or include a storage area on a predetermined server device (not shown) side.

A wireless communication section 4 modulates voice or data at the time of operation such as the calling function, the electronic mail function, or the Internet connection function, and transmits wireless waves from an antenna section. AT. Also, the wireless communication section 4 receives wireless waves via the antenna section. AT, demodulates it to voice or data, and thereby performs calling and data communication.

An operation section 5 has various push-button-type keys such as a power supply button. An external connection section 6 is a connector section for connection with an external device, and has for example, an HDMI (High-Definition Multimedia Interface) allowing bidirectional communications with the external device. The CPU 1 accesses the external connection section 6 to judge whether an external device has been connected or to determine the type of a connection device based on a response signal from the external device.

A touch display section 7 is structured by a touch panel 7b being laminated on a display panel 7a. The display panel 7a is, for example, a high-definition liquid-crystal display or organic EL (Electro Luminescence) display having a screen with an uneven aspect ratio (4:3 [width to height]), which displays a function name as a software key (a soft key) and also displays various icons.

The touch panel 7b of the touch display section 7 constitutes a touch screen which detects a point where a touch operation has been performed with a finger of a user or the like (including an operator such as a pen) and inputs coordinate data of the point. Note that, although a capacitive type or a resistive film type is adopted in this embodiment, another type may be adopted.

Also note that the touch operation herein is not limited to a contact operation by a finger or pen making contact with the touch panel 7b or making contact with and moving over the touch panel 7b. The touch operation includes, as an operation similar to the contact operation, a non-contact operation for which the position of a finger or a pen is detected based on changes in capacitance or brightness by the approach or the approach and movement of the finger or the pen. That is, the touch panel 7b is not limited to a contact-type touch panel which detects a contact operation, and may be a non-contact-type touch panel or operation detection device which detects a non-contact operation. In the present embodiment, however, the case of a contact operation is exemplarily described.

Upon detection of a touch operation on the touch display section 7, the CPU 1 judges whether a touch operation indicating a Point on the display screen (terminal screen) of the touch display section 7 has been performed, a touch operation for instructing change of contents displayed on the display screen (terminal screen) has been performed, or a touch operation for instructing input of a command or data has been performed, as details (type) of the touch operation.

Here, the touch operation indicating a point on the display screen (terminal screen) of the touch display section 7 includes, for example, a single touch operation (including a cursor moving operation) on a point where a soft key is displayed, and a multi-touch operation to simultaneously touch a plurality of displayed points with a plurality of fingers.

The touch operation for instructing change of contents displayed on the display screen includes, for example, a gesture operation for instructing display scrolling (flick operation), a gesture operation for instructing zooming in on displayed contents (pinch-out operation), and a gesture operation for instructing zooming out on displayed contents (pinch-in operation).

The touch operation for instructing input of a command or data is a gesture operation for instructing input of a command (such as switching an application) or data (data such as numerals and characters) according to gesture.

Figure 2:
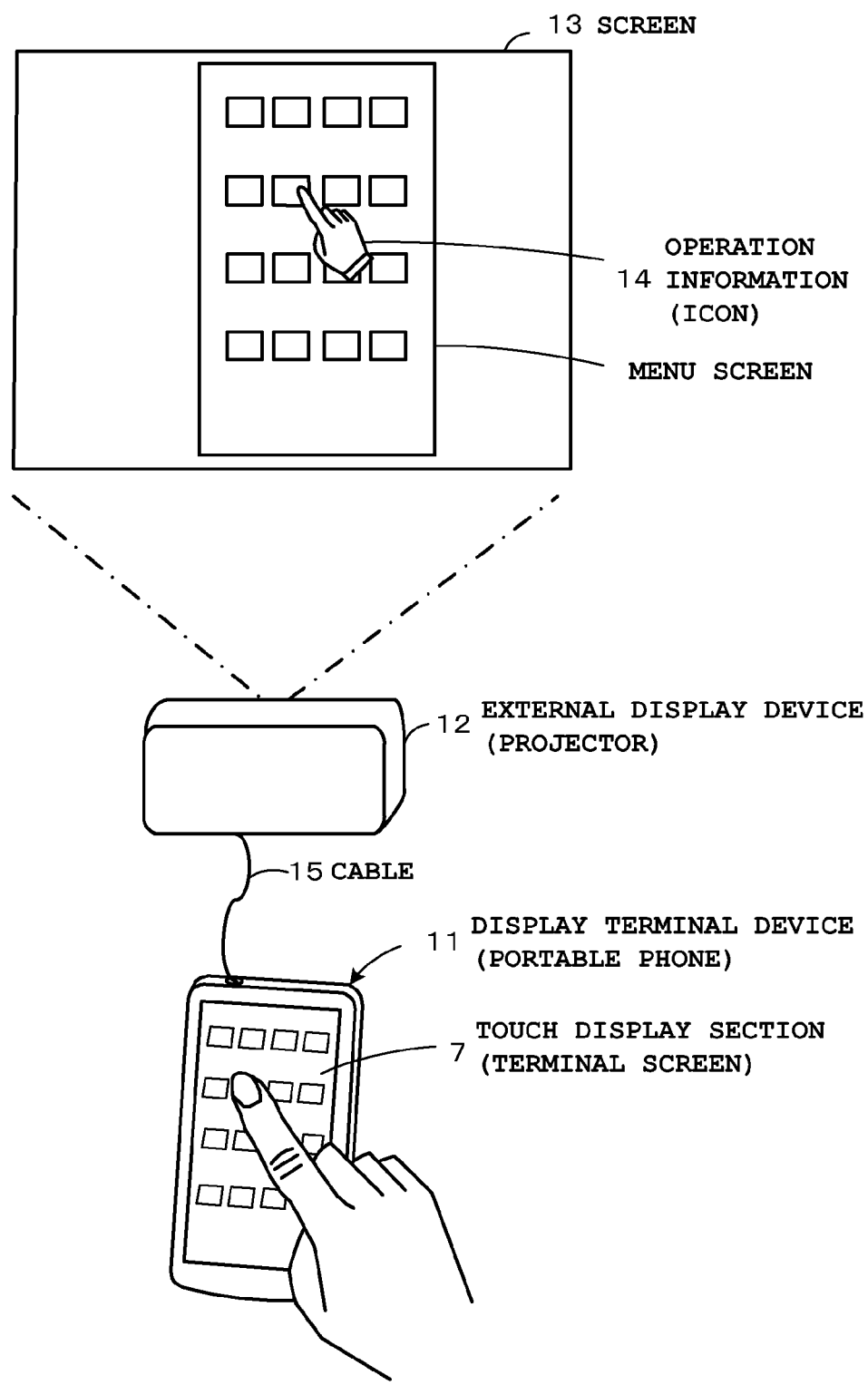
FIG. 2 is a diagram depicting a state in which contents displayed on a portable terminal device 11 have been transmitted to an external display device (projector) 12 and projected onto a screen 13.

FIG. 2 is a diagram depicting a state in which contents displayed on the portable terminal device 11 have been transmitted to an external display device (projector) 12 and projected onto a screen (for example, a whiteboard) 13.

The portable terminal device 11 is connectable to the external display device (an external device such as a projector) 12 via a cable 15 mounted on the external connection section 6. Between the portable terminal device 11 and the external display device 12, conjunctive display is possible. Note that not only a configuration where the portable terminal device 11 and the external display device 12 are linked by wired connection using the cable 15, but also a configuration where they are linked by wireless connection using a wireless LAN (Local Area Network) or infrared communication may be adopted.

A facilitator for presentation explains an operation procedure or operation method of the portable terminal device 11 while projecting contents displayed on the display screen (terminal screen) of the portable terminal device 11 onto the external display device (projector) 12. Here, information about a touch operation is transmitted to the external display device (projector) 12 for projection display onto the screen 13.

That is, when presenting various processing contents executable by the portable terminal device 11 at a presentation such as a meeting, the presenter proceeds with the presentation while projecting and displaying the way a touch operation is performed and a processing result achieved thereby on the screen 13.

Here, the portable terminal device 11 judges whether an external transmission mode (an operation mode: a demonstration mode) for transmitting contents displayed on the display screen (terminal screen) to the external display device 12 has been set.

This external transmission mode is switchable and set table by a user operation. When a touch operation on the touch display section 7 is detected in the external transmission mode, the portable terminal device 11 generates contents of a composite screen obtained by superimposing operation information indicating details of the touch operation (operation icon or animation image) 14 on the contents being displayed on the display screen (terminal screen), transmits the contents of the composite screen to the external display device 12, and thereby changes the contents being displayed on the external display device 12 (contents being displayed on the screen 13).

In the example in FIG. 2, a single touch operation using an index finger has been performed on the display position of a processing icon in order to specify desired processing from within a menu screen on the touch display section 7 where many processing icons are displayed as a list.

When a touch operation indicating a point on a menu screen (for example, a single touch operation) is performed as described above, the portable terminal device 11 generates contents of a composite screen obtained by superimposing an operation icon serving as operation information 14 indicating details of the touch operation and the touched point on the contents being displayed on the menu screen, and transmits the contents of the composite screen to the external display device 12.

As a result, the contents on the screen 13 are displayed as depicted in FIG. 2, and an icon created by stylizing the state of touching by an index finger is displayed on the menu screen as the operation information 14 indicating the touched point.

In this case, on the display screen (terminal screen) side of the portable terminal device 11, the touched processing icon is hidden under the operating finger and is difficult to view. However, on the screen 13, because of the configuration where the operation information (operation icon) 14 is placed and displayed near the touched processing icon, the processing icon and the operation icon are located in positions shifted from each other.

Note that the touch operation indicating a point on the display screen is not limited to a single touch operation described above, and may be a key operation for operating a soft key, a cursor moving operation, a multi-touch operation with a plurality of fingers, or the like. In this case, the operation icon indicating the details of the touch operation is an icon created by stylizing the type of the touched key, an icon created by stylizing the cursor moving direction, an icon created by stylizing the state of the touching with the plurality of fingers, or the like, and placed and displayed near the touched point.

In the example in FIG. 3, a touch operation (gesture display operation) for instructing change of contents being displayed on the terminal screen has been performed on the portable terminal device 11 side.

In the case of the example, a pinch-out operation (gesture display operation) where a thumb and an index finger are gradually and outwardly moved away from each other has been performed to instruct zooming in on the displayed contents. When a gesture display operation (for example, a pinch-out operation) for instructing change of contents being displayed on the terminal screen is performed as described above, the portable terminal device 11 generates contents of a composite screen obtained by superimposing the operation information (animation image) 14 indicating details of this touch operation on the contents of the terminal, and transmits the contents of the composite screen to the external display device 12.

As a result, the contents on the screen 13 are displayed as depicted in FIG. 3, in which an animation image of a thumb and an index finger that are gradually and outwardly moving away from each other is displayed. Note that the touch operation (gesture display operation) for instructing change of contents being displayed on the terminal screen is not limited to a pinch-out operation, and may be a pitch-in operation where a thumb and an index finger are gradually and inwardly moved towards each other, a scroll operation for instructing scrolling of displayed contents, or the like. In this case, any animation image indicating details of a touch operation may be placed and displayed as long as it represents a touch operation (gesture display operation).

FIG. 4 is a diagram for describing the touch operation table T1.

The touch operation table T1 is a table which stores "operation information" indicating details of a touch operation corresponding to "touch operation details", and can be arbitrarily set in advance by a user operation.

The "touch operation details" field includes "touch operation indicating point on screen (point indicating operation)", "touch operation for instructing change of contents being displayed on screen (gesture display operation)", and "touch operation for instructing input of command or data (gesture input operation)", Also, "point indicating operation" includes "key touch operation", "cursor moving operation", "multi-touch operation", and the like. As "operation information" corresponding to "key touch operation", "cursor moving operation", and "multi-touch operation", "A icon", "B icon", and "C icon", and the like are stored.

The "gesture display operation" field includes "flick operation", "pinch-in operation", "pinch-out operation", and the like. As "operation information" corresponding to these operations, "A animation image", "B animation image", "C animation image", and the like are stored. The "gesture input operation" field includes "command W input operation", "command B input operation", "numerical value 1 input operation", and the like. As "operation information" corresponding to these operations, "X animation image", "Y animation image", "Z animation image", and the like are stored. "Command W input operation" refers to a touch operation for inputting a command W to start an application for creating documents, and "Command E input operation" refers to a touch operation for inputting a command E to start an application for creating spreadsheets Next, the operational concept of the portable terminal device 11 in the first embodiment is described with reference to flowcharts shown in FIG. 5 and FIG. 6. Here, each function described in the flowcharts is stored in a readable program code format, and operations based on these program codes are sequentially performed.

Also, operations based on the above-described program codes transmitted over a transmission medium such as a network can also be sequentially performed. That is, the unique operations of the present embodiment can be performed using programs and data supplied from an outside source over a transmission medium, in addition to a recording medium. This applies to other embodiments described later.

Figure 5:
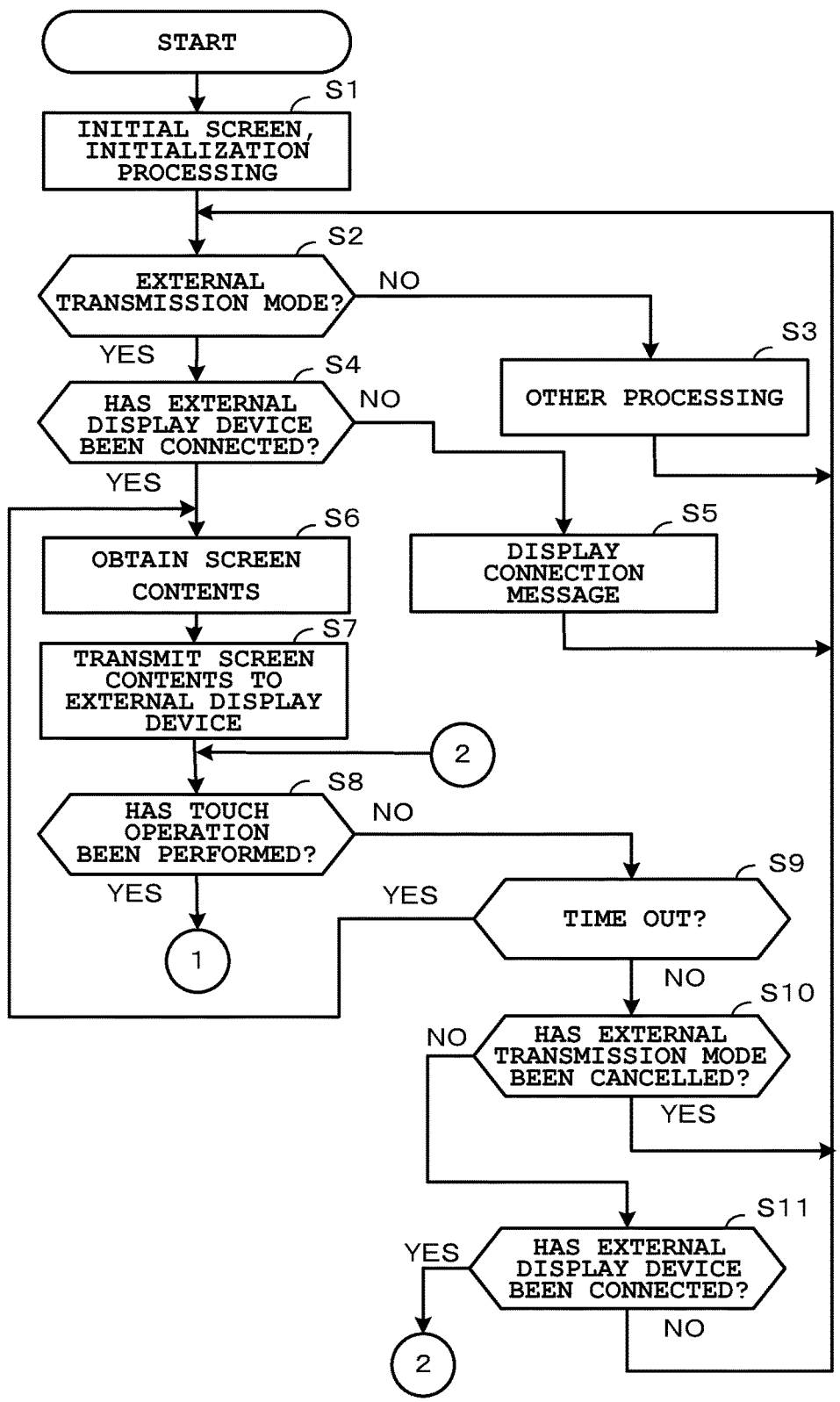
FIG. 5 is a flowchart outlining the operation of a characteristic portion of the present embodiment (conjunctive display between the portable terminal device 11 and the external display device 12) from among all of the operations of the portable terminal device 11.
Figure 6:
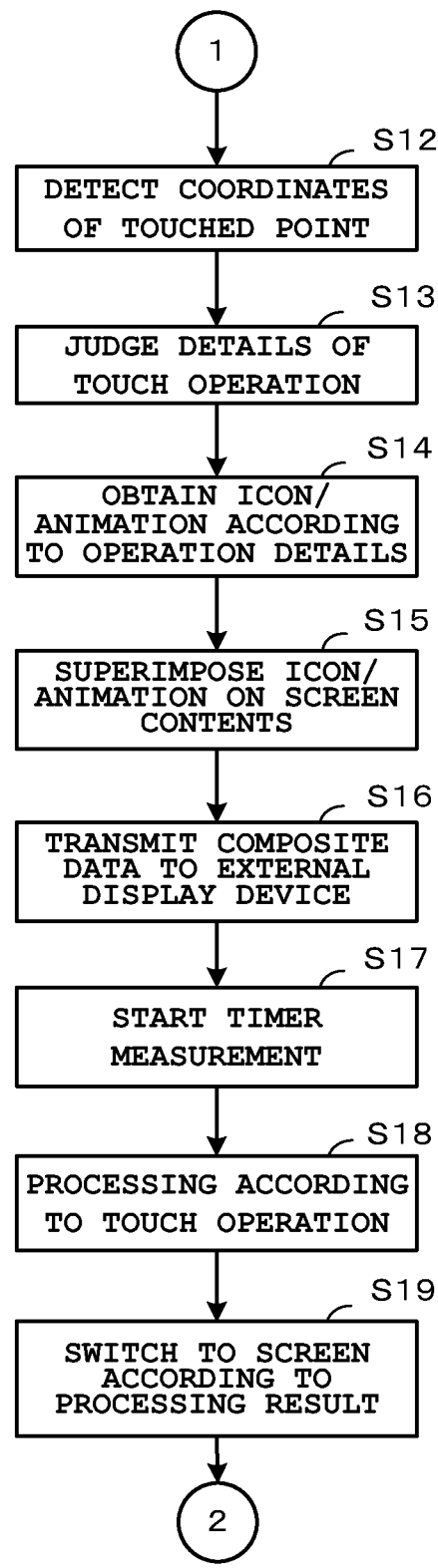
FIG. 6 is a flowchart of an operation following the operation of FIG. 5.

FIG. 5 and FIG. 6 are flowcharts outlining the operation of a characteristic portion of the present embodiment (conjunctive display between the portable terminal device 11 and the external display device 12) from among all of the operations of the portable terminal device 11, which is started in response to power being turned ON.

First, the CPU 1 displays an initial screen (for example, an initial menu screen) on the touch display section (terminal screen) 7, and performs initialization processing such as clearing a predetermined memory (Step S1 of FIG. 5). Then, the CPU 1 judges whether an external transmission mode (an operation mode; a demonstration mode) for transmitting contents being displayed on the touch display section (terminal screen) 7 to the external display device 12 has been set (Step S2).

When judged that the external transmission mode has not been set (NO at Step S2), the CPU 1 proceeds to processing other than the processing in the external transmission mode, such as processing for switching to and setting the external transmission mode, telephone calling processing, electronic mail transmission processing, or processing for creating and editing a presentation document (Step S3)

Here, if the user is to explain the operation procedure, operation method, and the like of the portable terminal device 11 by using the external display device (projector) 12, a mode switch key (omitted in the drawing) is operated to switch the current mode to and set the external transmission mode. Then, when the external transmission mode is set (YES at Step S2), the CPU 1 accesses the external connection section 6 to judge whether the external display device (projector) 12 has been connected (Step S4).

Here, in a case where the external transmission mode has been set but the external display device 12 has not been connected (NO at Step S4) the CPU 1 causes a message for prompting the user to connect the external display device 12 to be displayed (Step S5) and then returns to Step 52 described above.

Then, when judged that the external transmission mode has been set (YES at Step S2) and the external display device 12 has been connected (YES at Step S4), the CPU 1 reads and obtains contents being displayed on the touch display section 7 (Step S6), and transmits the contents from the external connection section 6 to the external display device 12 (Step S7).

In this case, if the initial menu screen is being displayed on the touch display section 7, the CPU 1 transmits this initial menu screen to the external display device 12. Therefore, the menu screen is projected and displayed on the screen 13. In this state, the CPU 1 judges whether a touch operation has been performed on the touch display section 7 (Step S8), whether a five-second timer (omitted in the drawing), which will be described further below, has reached time out (Step S9), whether the external transmission mode has been cancelled (Step S10), and whether the external display device 12 has been connected (Step S11).

The five-second timer described above is a timer which measures time elapsed from transmission of the contents of a composite screen obtained by superimposing the operation in (the operation icon or animation image) 14 on contents being displayed on the terminal screen to the external display device 12, and reaches time out after a lapse of five second from the transmission.

Here, before the time out (NO at Step S9), when judged that the external transmission mode has been cancelled (YES at Step S10) or the connection of the external display device 12 has been cancelled (NO at Step S11), the CPU 1 returns to Step S2 described above. Also, before the time out (NO at Step S9), when judged that the external display device 12 has been connected (YES at Step S11) without the external transmission mode being canceled (NO at Step S10), the CPU 1 returns to Step S2 described above, and waits for a touch operation and the time out.

Here, when a touch operation is detected (YES at Step S8) the CPU 1 returns to the flow of FIG. 6 to detect the coordinates of the touched point (Step S12) and judge details of the touch operation (Step S13). That is, regarding details of the touch operation, the CPU 1 judges whether a touch operation indicating a point on the display screen of the touch display section 7 has been performed, a touch operation for instructing change of contents being displayed on the display screen has been performed, or a touch operation for instructing input of a command or data has been performed. Based on the details of the touch operation judged by the step described above, the CPU 1 refers to the touch operation table T1 to read and obtain corresponding "operation information" (Step S14).

Then, the CPU 1 superimposes the obtained operation information (operation icon/animation image) on the contents being displayed on the display screen (Step S15). In this case, the CPU 1 superimposes the operation information (operation icon/animation image) on the touched point or an area near the touched point in the display screen. For example, if the touched point is on a processing icon, the CPU 1 superimposes the operation information on an area near the processing icon.

Then, the CPU 1 transmits the contents of the generated composite screen to the external display device 12 and thereby changes the display contents on the external display device 12 (contents being displayed on the screen 13) (Step S16) Then, the CPU 1 starts a measuring operation by the five-second timer in accordance with the transmission timing of the contents of the composite screen (Step S17), and performs processing according to the touch operation (Step S18).

For example, when a processing icon is touched, the CPU. 1 starts its application and displays the application screen on the touch display section 7. Then, for example, when a pinch-in operation or a pinch-out operation is performed as a gesture operation on the application screen, the CPU 1 causes a displayed area specified by the operation (for example, a table or a graph) to be zoomed out or zoomed in. Also, when a flick operation is performed as a gesture operation, the CPU 1 causes the display contents to be scrolled in the operating direction. As such, the CPU 1 performs processing according to the touch operation, and causes the display screen of the touch display section 7 to be switched and displayed to a screen according to the processing result (Step S19).

Thereafter, the CPU 1 returns to Step S8 of FIG. 5, and repeats the operations described above (Step S12 to Step S19 of FIG. 6) every time a touch operation is performed (YES at Step S8). Here, when the time out is detected (YES at Step S9), the CPU 1 returns to Step S6 described above to transmit the contents currently being displayed on the terminal screen to the external display device 12, and thereby changes the display contents on the external display device 12 side (display contents on the screen 13) (Step S7).

As a result, the display contents on the external display device 12 side (display contents on the screen 13) are switched to the contents of the current terminal screen in place of the above-described contents of the composite screen, or in other words, the screen contents of the processing result according to the previous touch operation (Step S18 and Step S19 of FIG. 6). Also, when the next touch operation is performed before the time out (YES at Step S8), the screen is switched to a screen obtained by superimposing and displaying operation information indicating details of the touch operation (Step S12 to Step S16 of FIG. 6).

As described above, in the external transmission mode, when a touch operation is detected, the portable terminal device 11 of the first embodiment generates contents of a composite screen obtained by superimposing operation information (operation icon or animation image) 14 indicating details of the touch operation on contents being displayed on the display screen (terminal screen), and transmits the contents of the composite screen to the external display device 12 to change display contents on the external display device 12 side (the display contents on the screen 13). As a result of this configuration, operation information indicating the details of a touch operation is not displayed on the display screen of the portable terminal device 11, which eliminates a possibility of display contents near the touched point being difficult to view. Accordingly, display viewability can be maintained without impairing operability on the terminal side. Thus, the present invention is practically useful in that operability and viewability can both be satisfied.

Also, the portable terminal device 11 transmits contents being displayed on the terminal screen to the external display device 12 on condition that the external transmission mode has been set and the external display device 12 has been connected. Thus, inadvertent display on the external display device 12 side can be prevented, and an operation on the portable terminal device 11 side for instructing the start of transmission is not required.

Moreover, the portable terminal device 11 transmits contents being displayed on the terminal screen to the external display device 12 when the five-second timer, which measures time elapsed from transmission of the contents of a composite screen obtained by superimposing operation information to the external display device 12, reaches time out. As a result of this configuration, operation information on the screen 13 can be continuously projected and displayed for five seconds unless the next touch operation is performed, which allows participants in presentation to visually and easily check the details of an operation and to easily understand which operation has been performed.

Furthermore, the portable terminal device 11 detects at least one of a touch operation indicating a point on the terminal screen, a touch operation for instructing change of contents being displayed on the terminal screen, and a touch operation for instructing input of a command or data. As a result of this configuration, the portable terminal device 11 can support touch operations of various types or can support specifically a touch operation of a specific type.

Still further, when a touch operation indicating a point on the terminal screen is performed, the portable terminal device 11 superimposes, as details of the touch operation, an icon indicating the touched point on contents being displayed on the terminal screen. When a touch operation for making an instruction for instructing change of contents being displayed on the terminal screen is performed, the portable terminal device 11 superimposes, as details of the touch operation, an animation image indicating the type of the change on contents being displayed on the terminal screen. When a touch operation for instructing input of a command or data is performed, the portable terminal device 11 superimposes, as details of the touch operation, an animation image indicating the type of the input on contents being displayed on the terminal screen. This makes it easy for participants in the presentation to intuitively understand the operation details, and allows the participants to easily understand which operation has been performed.

In the first embodiment described above, the external transmission mode (a demonstration mode) is freely switchable and settable by a user operation. However, the external transmission mode is not necessarily required to be set by a user operation, and a configuration may be adopted in which the external transmission mode is automatically set in response to the connection of the external display device 12.

<Second Embodiment>

A second embodiment of the present invention is described below with reference to FIG. 7.

In the first embodiment described above, the CPU 1 transmits the contents of a composite screen obtained by superimposing the operation information 14 on condition that a touch operation has been performed in the external transmission mode. However, in the second embodiment, this transmission is made on condition that a touch operation has been performed with the external display device 12 being connected to the portable terminal device 11.

Note that sections that are basically the same or have the same name in both embodiments are given the same reference numerals, and therefore explanations thereof are omitted. Hereafter, the characteristic portion of the second embodiment will mainly be described.

FIG. 7 is a flowchart of an operation that is performed in the second embodiment in place of the flow of FIG. 5, which is followed by operations similar to those of the flow of FIG. 6.

First, the CPU 1 displays an initial screen (for example, an initial menus screen) on the touch display section (terminal screen) 7 and performs, for example, initialization processing such as clearing a predetermined memory (Step S20). Then, the CPU 1 accesses the external connection section 6 to judge whether the external display device (projector) 12 has been connected (Step S21). When judged that the external display device 12 has not been connected (NO at Step S21), the CPU I proceeds to other processing such as telephone calling processing or electronic mail transmission processing (Step S22).

When judged that the external display device 12 has been connected (YES at Step S21), the CPU 1 judges whether the connected device is a projector according to exchange with the external display device 12 (Step S23). When judged that the connected device is not a projector (NO at Step S23), the CPU 1 proceeds to display processing on the external display device 12 supporting the connected device (Step S24). When judged that the connected device is a projector (YES at Step S23) the CPU 1 reads and obtains contents being displayed on the touch display section 7 (Step S25), and transmits the contents of the screen from the external connection section 6 to the external display device 12 (Step S26).

In this state, the CPU 1 judges whether a touch operation has been performed on the touch display section 7 (Step S27), whether the five-second timer (omitted in the drawing) has reached time out (Step S28), and whether the external display device (projector) 12 has been connected (Step S29).

Here, before the time out (NO at Step S28), when judged that the connection of the external display device (projector) 12 has been cancelled (NO at Step S29), the CPU 1 returns to Step S21 described above. Also, before the time out (NO at Step S27), when judged that the external display device (projector) 12 has been connected (YES at Step S29), the CPU 1 returns to Step S27 described above, and waits for a touch operation and the time out.

Here, when a touch operation is detected (YES at Step S27), the CPU 1 returns to the flow of FIG. 6, and performs processing similar to that of the first embodiment (Step S11 to Step S19) That is, the CPU 1 detects the coordinates of the touched point (Step S12), judges details of the touch operation (Step S13), and obtains corresponding "operation information" from the touch operation table T1, based on the details of the touch operation (Step S14).

Then, the CPU 1 superimposes the obtained operation information on the contents being displayed on the display screen (Step S15), and transmits the contents of the generated composite screen to the external display device 12 (Step S16). Then, the CPU 1 starts a measuring operation by the five-second timer (Step S17), and after performing processing according to the touch operation (Step S18), switches the current screen to a screen according to the processing result (Step S19). Thereafter, the CPU 1 returns to Step S27 of FIG. 7, and repeats the operations described above (Step S12 to Step S19 of FIG. 6) every time a touch operation is performed (YES at Step S27).

As described above, in the second embodiment, when a touch operation is detected with the external display device 12 being connected, the portable terminal device 11 generates contents of a composite screen obtained by superimposing operation information (operation icon or animation image) indicating details of the touch operation on contents being displayed on the display screen (terminal screen), and transmits the contents of the composite screen to the external display device 12 to change display contents on the external display device 12 side (display contents on the screen 13). Therefore, effects similar to those of the first embodiment can be achieved.

That is, operation information indicating the details of a touch operation is not displayed on the display screen (terminal screen) of the portable terminal device 11, which eliminates a possibility of display contents near the touched point being difficult to view. Accordingly, display viewability can be maintained without impairing operability on the terminal side, whereby operability and viewability can both be satisfied.

Also, the portable terminal device 11 transmits contents being displayed on the terminal screen to the external display device 12 on condition that the external display device 12 has been connected and the connected device is a predetermined device (projector). Thus, inadvertent display on the external display device 12 side can be prevented, and an operation on the portable terminal device 11 side for instructing the start of transmission is not required.

Moreover, effects similar to those of the first embodiment described above can be achieved in the second embodiment. That is, when the five-second timer reaches time out, the CPU 1 transmits contents being displayed on the terminal screen to the external display device 12. As a result of this configuration, operation information on the screen 13 can be continuously projected and displayed for five seconds unless the next touch operation is performed.

Furthermore, the portable terminal device 11 detects at least one of a touch operation indicating a point on the terminal screen, a touch operation for instructing change of contents being displayed on the terminal screen, and a touch operation for instructing input of a command or data As a result of this configuration, the portable terminal device 11 can support touch operations of various types or can support specifically a touch operation of a specific type. Still further, the portable terminal device 11 superimposes an icon or animation image serving as operation information on contents being displayed on the terminal screen. This makes it easy to intuitively understand the operation details, and allows easy understanding of which operation has been performed.

In each of the embodiments described above, an icon and an animation image are given as operation information indicating details of a touch operation. However, the operation information may be, for example, character information, a still image, a moving image, or a combination thereof. Also, operation information freely selected and designated by a user operation may be displayed.

Also, in each of the embodiments described above, the present invention has been applied to a portable phone as a display terminal device. However, the present invention is not limited thereto, and may be applied to a personal computer, a PDA (Personal Digital Assistant) such as a tablet terminal, or a digital camera.

Moreover, in each of the embodiments described above, a projector has been described as an example of the external display device 12. However, the present invention is not limited to thereto, and the external display device 12 may be a display device of a personal computer, a tablet terminal, a television set, or a portable terminal device. For example, in a case where the portable terminal device 11 is an electronic watch and the external display device 12 is a tablet terminal, since the screen of the tablet terminal is larger than the screen of the electronic watch, the user can view a processing result while checking the operating status of the watch with the use of the large screen (tablet terminal screen) That is, the operability and the viewability are both satisfied.

Furthermore, the "devices" or the "sections" described in the above-described embodiments are not required to be in a single housing and may be separated into a plurality of housings by function. In addition, the steps in the above-described flowcharts are not required to be processed in time-series and may be processed in parallel, or individually and independently.

While the present invention has been described with reference to the preferred embodiments, it is intended that the invention be not limited by any of the details of the description therein but includes all the embodiments which fall within the scope of the appended claims.

What is claimed is:

1. A display terminal device having a display screen on which a touch operation can be performed at an arbitrary point, the display terminal device comprising:
   a controlling section which performs control to display, on the display screen, first screen information for the display screen, and to generate second screen information identical to the first screen information and transmit the generated second screen information to an external display device;
   a judging section which, when a gesture operation by a finger performing an arbitrary touch operation is detected on a point on the display screen on which the first screen information is being displayed, detects the point of the touch operation on the display screen, and judges which gesture operation type, from among a plurality of gesture operation types prepared in advance including at least a pinch-out operation type and a flick operation type, an operation type of operation contents of the gesture operation on the display screen corresponds to; and
   a superimposing section which selects a pinch-out operation imaging image representing, as a gesture image, a pinch-out operation by a gesture by fingers of a hand if the judged gesture operation type is the pinch-out operation type, and selects a flick operation imaging image representing, as a gesture image, a flick operation by a gesture by fingers of a hand if the judged gesture operation type is the flick operation type, and superimposes the selected operation imaging image near the detected point of the touch operation on the second screen information, wherein, when the gesture operation is detected, the controlling section performs control to transmit, to the external display device, composite second screen information obtained by superimposing the operation imaging image on the second screen information, without changing display contents of the first screen information being displayed on the display screen.

2. The display terminal device according to claim 1, further comprising a storage section which stores, as the operation imaging image, a different operation animation image representing a different gesture operation in association with each of the plurality of gesture operation types, wherein the superimposing section superimposes a stored operation animation image corresponding to the judged gesture operation type on the second screen information.

3. The display terminal device according to claim 1, wherein, when the external display device is connected to the display terminal device, the controlling section performs control to generate the second screen information or the composite second screen information and transmit the generated second screen information or the generated composite second screen information to the connected external display device.

4. The display terminal device according to claim 3, wherein the controlling section judges whether the external display device connected to the display terminal device is a specified external display device specified in advance, and, when it is judged that a specified external display device is connected to the display terminal device, the controlling section performs control to generate the second screen information or the composite second screen information and to transmit the generated second screen information or the obtained composite second screen information to the connected external display device.

5. The display terminal device according to claim 1, wherein, when the display terminal device is set in an external transmission mode, the controlling section performs control to generate the second screen information or the composite second screen information and transmit the generated second screen information or the generated composite second screen information to the connected external display device.

6. The display terminal device according to claim 1, wherein, when a predetermined time has elapsed after detecting the touch operation, the controlling section controls the external display device such that display contents being displayed on the external display device becomes identical to display contents being displayed on the display screen of the display terminal device.

7. A method for a display terminal device having a display screen on which a touch operation can be performed at an arbitrary point, the method comprising:

performing control to display, on the display screen, first screen information for the display screen, and to generate second screen information identical to the first screen information and transmit the generated second screen information to an external display device;

when a gesture operation by a finger performing an arbitrary touch operation is detected on a point on the display screen on which the first screen information is being displayed, detecting the point of the touch operation on the display screen, and judging which gesture operation type, from among a plurality of gesture operation types prepared in advance including at least a pinch-out operation type and a flick operation type, an operation type of operation contents of the gesture operation on the display screen corresponds to; and selecting a pinch-out operation imaging image representing, as a gesture image, a pinch-out operation by a gesture by fingers of a hand if the judged gesture operation type is the pinch-out operation type, and selecting a flick operation imaging image representing, as a gesture image, a flick operation by a gesture by fingers of a hand if the judged gesture operation type is the flick operation type, and superimposing the selected operation imaging image near the detected point of the touch operation on the second screen information, wherein, when the gesture operation is detected, control is performed to transmit, to the external display device, composite second screen information obtained by superimposing the operation imaging image on the second screen information, without changing display contents of the first screen information being displayed on the display screen.

\* \* \* \* \*